United States Patent [19]

Kohne, Jr. et al.

[11] 3,931,061
[45] Jan. 6, 1976

[54] BLUSHED POLYSTYRENE PIGMENT

[75] Inventors: Harry F. Kohne, Jr., Glenwood; Frederick L. Kurrle, Laurel, both of Md.

[73] Assignee: Westvaco Corporation, New York, N.Y.

[22] Filed: Dec. 3, 1974

[21] Appl. No.: 529,093

Related U.S. Application Data

[63] Continuation-in-part of Ser. No. 388,383, Aug. 15, 1973, abandoned.

[52] U.S. Cl. ........... 260/2.5 B; 162/168 N; 162/169; 260/893
[51] Int. Cl.² ........................................... C08J 9/00
[58] Field of Search .................................. 260/2.5 B

[56] References Cited
UNITED STATES PATENTS

| | | | |
|---|---|---|---|
| 3,255,127 | 6/1966 | Von Bonin | 260/2.5 B |
| 3,371,053 | 2/1968 | Raskin | 260/2.5 B |
| 3,472,801 | 10/1969 | Lerman et al. | 260/2.5 B |

*Primary Examiner*—Richard B. Turer

[57] ABSTRACT

A blushed and opaque pigment consisting essentially of spherical particles having a high optical efficiency and an average particle diameter in the range of from about 0.1 to 0.2 micron is produced from a polystyrene containing latex emulsion. The blushed and opaque particles have an air containing microporous structure as a result of air-solid interfaces within the pigment particles, which interfaces are created when the particles are penetrated and swollen by a swelling agent for the particle material and then the swelling agent is removed to set the particles in their swollen and blushed state.

2 Claims, No Drawings

BLUSHED POLYSTYRENE PIGMENT

CROSS-REFERENCE TO RELATED PATENT APPLICATIONS

This application is a continuation-in-part of applicant's copending application Ser. No. 388,383, filed Aug. 15, 1973 (now abandoned) and also entitled BLUSHED POLYSTYRENE PIGMENT. This application contains subject matter common to the following prior copending applications, U.S. patent application Ser. No. 196,199, filed Nov. 5, 1971, now U.S. Pat. No. 3,775,353; U.S. patent application Ser. No. 388,368, filed Aug. 15, 1973; and, U.S. patent application Ser. No. 388,369, filed Aug. 15, 1973, now U.S. Pat. No. 3,897,300.

SUMMARY OF THE INVENTION

A blushed and opaque pigment consisting essentially of spherical particles having an average particle diameter in the range of from 0.10 to 0.20 micron is produced in accordance with the process disclosed in applicants' prior U.S. Pat. No. 3,775,353. The principle of the process disclosed in the prior patent relies on the creation of void volume within the particles of a polystyrene containing emulsion. The void volume created produces air-solid interfaces within the particles by a blushing technique. The blushing technique disclosed increases the volume of the individual particles of the emulsion without changing their mass and in so doing produces a significant increase in the scattering coefficient of the particles by providing an increase in the light scattering sites associated with the particles. Thus for the purpose of the present invention, a blushed pigment is defined as one that is optically efficient and which includes void volume or air-solid interfaces within the pigment particles.

The preferred method of preparing the product as disclosed in applicants' prior patent consists of the high shear mixing of a polystyrene-containing aqueous emulsion with a swelling agent for polystyrene. The swelling agent penetrates the emulsion particles causing the particles to swell, and these swollen particles are then set in their swollen state by one of several different treatments depending upon the type of swelling agent used. For a partially water miscible swelling agent, a washing and filtering step is used to remove the swelling agent from the particles and set them in their swollen state. In the case of a swelling agent which is essentially non-water miscible, the system is mixed to achieve maximum penetration and swelling of the polymer or copolymer particles and the emulsion is then filtered and dried at about 60°C. or below for end use. Finally in systems where removal of the swelling agent is not necessary, the treated emulsion system may be used without either filtering or drying the product. Thus the product produced consists of expanded spherical particles of the original latex emulsion which have an air containing microporous structure as a result of the creation of air-solid interfaces within the particles or void volume within the particles.

In preparing the blushed and opaque pigment, the ultimate particle dimensions were found to be determined by the particle size of the starting material and the degree of swelling permitted during the process. The starting and final particle dimensions could have been determined by any means known in the art, but in the present case, two different techniques were used.

The starting particle dimensions were determined using a turbidity technique developed especially for the latex industry by Rohm and Haas Chemical Company.

The turbidity technique is carried out by measuring the light absorption of a sample of the latex emulsion at 425 nm at 40% solids and diluted 125 times. Thus, for example, a 2cc. latex sample is diluted to 250 cc. in a volumetric flask. A micro absorption cell equipped with a micro cell insert Fisher 7-102-66 or 7-102-67 is filled with the diluted sample and the optical density is measured with a Fisher electrophotometer using a 425 millimicron filter. Since the particle size of the latex is directly related to the surface area of the particles (the smaller the particles the larger the surface area or more light reflected), the solution that is most turbid has the smallest particle size distribution.

Using the above described technique, the particles of the Dow SD-188 latex were found to have an average particle diameter on the order of from 0.10 to 0.15 micron. The copolymer particles described hereafter (83% polystyrene and 17% acrylonitrile) were found to have an average particle diameter on the order of from 0.10 to 0.12 micron.

The final particle dimensions after blushing were measured on photographic prints prepared from electronmicrographs of the blushed material. It was found that the blushing process yielded a final ultimate particle diameter in the range of from about 0.10 to 0.20 micron. Thus, little or no measurable differences in particle diameters after blushing were detected. However, the above result was not surprising since it was known that extremely small changes in the diameter of spherical particles would be capable of producing large changes in the volume of the spheres. Thus it was concluded that the changes in volume produced by practicing the process disclosed in applicants' prior patent yielded voids or air-solid interfaces within the particles which in turn produced the increases in scattering coefficients measured.

DETAILED DESCRIPTION

The invention is best described with the aid of the following examples:

EXAMPLE I

Paper machine trials were made to compare the properties of the blushed and opaque polystyrene pigment directly with $TiO_2$. The pigment was prepared in batches by charging a Waring blendor with 100 ml. of an aqueous emulsion of Dow SD-188 polystyrene at 40.0% solids (average particle diameter 0.10 to 0.15 micron). The emulsion was agitated at 14,000 rpm, and immediately thereafter, 25 ml. of ethyl acetate, a true solvent for polystyrene, (water solubility 8.6 g./100 ml) was added to the emulsion from a graduated cylinder. The average time for initial thickening of the emulsion into a smooth paste was 46 seconds. An additional 100 ml. of water was then added to the mixture and agitation continued for 5 minutes. After this time period, each batch was diluted in an excess of water, filtered and washed. Enough batches were prepared for evaluation of the product as a wet end pigment additive. The final particle dimension of the blushed pigment was determined to be from about 0.10 to 0.20 micron.

Thereafter, the pigment was compared with $TiO_2$ on a paper machine. The pulp furnish, Luke "Hi-Brite", 70% hardwood and 30% softwood, was beaten to 100 seconds Williams freeness and a paper machine run was made with 100% of this pulp as a control. The paper machine runs for comparing the polystyrene and TiO₂ consisted of 90% "Hi-Brite" pulp and 10% TiO₂ in the first case, and 90% "Hi-Brite" pulp and 10% polystyrene in the second case. Data from the machine trials is shown in Table 1.

TABLE 1

| | Optical Data - Filler Pigment | | | |
|---|---|---|---|---|
| | 100% Pulp | 17.4% Clay in furnish | 10% TiO₂ in furnish | 10% P.S. in furnish |
| Basis wt. | 31.9 | 34.1 | 29.7 | 30.4 |
| Caliper | .0036 | .0040 | .0036 | .0040 |
| % Filler | — | 7.29 | 5.74 | 4.66 |
| LRL Brightness | 83.5 | 81.8 | 87.1 | 86.6 |
| B&L Opacity | 71.5 | 77.7 | 81.8 | 79.6 |
| Scat. Coeff. | — | .181 | .735 | .641 |

The runnability of the blushed polystyrene pigment on the paper machine was excellent. There was no evidence of foam development and the sheet formation was excellent. The optical results indicated that the blushed pigment was nearly equivalent to TiO₂ with respective scattering coefficients of 0.641 and 0.735. Moreover, the blushed pigment filled sheet demonstrated a much higher scattering coefficient than the clay filled sheet. Wet end retention data indicated a single pass retention for the blushed polystyrene pigment of 46.6% compared with 57.4% retention for TiO₂ and 41.9% for clay. Furthermore, the caliper data reproduced in Table 1 shows a bulkier sheet with the polystyrene filler as compared with the TiO₂ filled sheet.

EXAMPLE II

In this example, evidence was obtained to show the effects on the optical efficiency of the polystyrene emulsion induced by treatment with a swelling agent to produce the novel blushed polystyrene pigment disclosed herein. For this purpose, the untreated aqueous polystyrene emulsion, Dow SD-188, was mixed with 2% sodium carboxymethylcellulose as a binder, and drawdowns were made on cellophane at two different coat weights. Optical data was then taken for the two coatings.

Next, the procedure outlined in Example I was followed to prepare a blushed polystyrene pigment from the same Dow SD-188 aqueous emulsion, by treating the emulsion with ethyl acetate as the swelling agent to swell and set the polystyrene pigment particles. The treated emulsion was mixed with a 2% solution of sodim carboxymethylcellulose as a binder, and hand drawdowns of the coating composition were made on cellophane at two different coat weights. The optical data comparision is shown in Table 2.

TABLE 2

| Condition | Coat Wt. (lbs./rm.) | LRL Brightness | B&L Opacity | Scattering Coefficient |
|---|---|---|---|---|
| Untreated Emulsion | 2.0 | 66.6 | 12.8 | .06 |
| Polystyrene Pigment | 2.3 | 84.4 | 55.2 | .41 |
| Untreated Emulsion | 14.3 | 75.4 | 29.0 | .02 |
| Polystyrene Pigment | 12.0 | 94.2 | 91.9 | .48 |

The data in Table 2 indicates that large brightness and opacity increases result when the untreated emulsion is treated in accordance with the process disclosed in applicants' prior patent U.S. Pat. No. 3,775,353 to form the expanded and blushed polystyrene particles described. In addition, the results show that larger relative increases in brightness and opacity may be expected at heavier coat weights. The values for scattering coefficient reflect the relative optical efficiencies of the untreated and treated polystyrene spheres.

EXAMPLE III

To determine the effectiveness of the synthetic blushed polystyrene pigment in copolymer form, and, using a different swelling agent, an aqueous copolymer latex emulsion of 83% sytrene, 17% acrylonitrile at 39.5% solids (average particle diameter 0.10 to 0.12 micron) was used to prepare the blushed organic filler. In this experiment, increasing concentrations of the swelling agent VM and P naphtha were metered into 100 ml. of the copolymer latex in a Waring blendor, with the mixing continuing for 5 minutes at 14,000 rpm to produce a blushed polystyrene containing pigment having an average ultimate particle diameter of from about 0.10 to 0.20 micron. The treated emulsions were then combined with Dow 620 latex binder (25 parts Dow/100 parts polystyrene acrylonitrile) and drawdowns were made on cellophane to determine the optical properties achieved. The results are shown in Table 3.

TABLE 3

| VM&P Concentration | LRL Brightness | B&L Opacity | Coat wt. (lbs./rm.) | Scattering Coefficient |
|---|---|---|---|---|
| ml. | | | | |
| 0 | 83.7 | 48.5 | 6.4 | .12 |
| 5 | 88.0 | 63.0 | 8.8 | .15 |
| 10 | 86.0 | 57.7 | 5.7 | .19 |
| 20 | 93.3 | 88.8 | 16.6 | .26 |
| 30 | 91.3 | 76.2 | 5.3 | .43 |
| 40 | 90.6 | 79.1 | 5.3 | .49 |
| 50 | 92.9 | 86.1 | 7.9 | .49 |
| 60 | 90.2 | 75.1 | 4.2 | .51 |

The data in Table 3 demonstrates that with increased concentrations of VM and P naphtha, the optical efficiency of the copolymer increases up to about the 40 ml. level. Accordingly, this example illustrates that a copolymer of polystyrene may be made to perform satisfactorily in producing the blushed pigment disclosed herein.

EXAMPLE IV

In order to show the level of optical efficiency achieved by treating the aqueous emulsion used in Example III, a small Waring blendor batch of the blushed pigment was prepared as outlined in Example III and used to make drawdowns on cellophane with 2% sodium carboxymethylcellulose as a binder. The optical data from the treated emulsion was then compared with the optical data taken from an untreated sample of the emulsion as shown in Table 4.

TABLE 4

| Condition | LRL Brightness | B&L Opacity | Coat Weight | Scattering Coefficient |
|---|---|---|---|---|
| Untreated Emulsion | 72.8 | 17.4 | 2.5 | .07 |
| Polystyrene Pigment | 90.4 | 67.7 | 3.5 | .45 |
| Untreated Emulsion | 82.9 | 41.1 | 14.4 | .04 |
| Polystyrene Pigment | 95.2 | 89.8 | 11.7 | .42 |

The data obtained shows that a large increase in optical efficiency was produced by treating the polystyrene containing emulsion in accordance with the process disclosed in applicants' prior patent.

EXAMPLE V

The G.E. bulk brightness of the blushed pigment was determined using TAPPI Standard T 646 m-54. Two samples were used as prepared in a Waring Blendor including a representative sample of the ethyl acetate treated Dow SD-188 polystyrene emulsion and a sample of the polystyrene containing emulsion (83% polystyrene —17% acrylonitrile) treated with VM&P naphtha. The results obtained are shown in Table 5.

TABLE 5

| Emulsion | Treatment | G.E. Bulk Brightness |
|---|---|---|
| Dow SD-188 Polystyrene | Ethyl Acetate | 99.7 |
| Polystyrene Copolymer (83% Polystyrene-17% Acrylonitrile) | VM&P Naphtha | 99.4 |

The results shown in Table 5 demonstrate the fact that the brightness of the inorganic pigment disclosed herein is extremely high (magnesium oxide the standard, has a G.E. Bulk Brightness of 100.0) which factor contributes to the optical efficiency of the pigment particularly when used as a paper filler or coating pigment. The TAPPI test does not give a complete description of color, although for the paper maker, the G.E. Bulk Brightness of a pigment is a convenient means for indicating the color of commercially white materials. Thus it may be seen that the pigment of the present invention is extremely white in color as compared with other white materials and it is believed that this factor is an important novel feature of the pigment.

In determining the scattering coefficient for each filler pigment, the opacity of the handsheets containing the filler was first measured according to Tappi Standard T 425 with a B and L Opacimeter. Reflectance of the handsheets was determined at 457 millimicrons using an LRL integrating sphere reflectometer. Control handsheets, similar in all respects to the filled sheets, except that they contained papermaking pulp only, were also tested for opacity. By using Tappi Data Sheet No. 65, which contains a graphical solution of the Kubelka-Munk equations relating Tappi opacity, bulk reflectance, and total light scattering power of the handsheet, the brightness of the sheets was obtained. Total light scatttering power is defined as the product of the scattering coefficient and the basis weight of the handsheet, based on a 3300 square feet ream.

The value for total light scattering power of the control was divided by the basis weight of the handsheet to arrive at the scattering coefficient of the papermaking pulp. To determine the total scattering power for the filler in a filled handsheet, the scattering coefficient for the pulp, as determined from the control, was multiplied by the weight of pulp in the filled sheet, and this value was subtracted from the total scattering power of the filled sheet to obtain the total scattering value for the filler portion of the sheet. The scattering coefficient for the filler was then determined by dividing the total scattering value for the filler by the basis weight of the filler in the handsheet. Scattering coefficients given throughout this specification were determined in the above described manner.

The blushed and opaque organic filler material disclosed herein is deemed novel primarily because of its optical efficiency, new structure and small average particle size distribution. The high opacity produced by blushing the polystyrene containing emulsion particles is surprising since the refractive index of polystyrene is not particularly high, being on the order of about 1.6. A refractive index as low as 1.6 would not suggest the high optical performance demonstrated by the pigment.

The unique properties of the organic pigment disclosed herein yields benefits in both paper quality and manufacture, and could be used successfully in other environments such as paints. It is the sum of these benefits, which no inorganic pigment can offer, that enables paper makers to realize meaningful cost performance advantages, while permitting the development of new paper grades not previously possible. For this reason, the invention is not intended to be limited by the disclosure set forth hereinbefore, but should be construed in accordance with the appended claims.

We claim:

1. A composition of matter comprising a synthetic opaque polystyrene pigment prepared from a polystyrne emulsion and consisting essentially of expanded spherical particles that are optically efficient in the absence of mineral matter, characterized as:
   1. having an air containing microporous structure as a result of the presence of air-solid interfaces within the individual particles;
   2. having an average ultimate particle diameter in the range of from about 0.10 and 0.20 micron;
   3. having a G.E. Bulk brightness of about 99.7; and
   4. having a scattering coefficient of from about 0.41 to 0.48 when applied to cellophane with a 2% solution of sodium carboxymethylcellulose at a coa weight of from about 2.3 to 12.0 pounds per ream 2. A composition of matter comprising a syntheti opaque polystyrene containing pigment prepared fron a polystyrene containing emulsion and consisting es sentially of expanded spherical particles that are opti cally efficient in the absence of mineral matter, charac terized as:
   1. having an air containing microporous structure a a result of the presence of air-solid interface within the individual particles;

2. having an average ultimate particle diameter in the range of from about 0.10 to 0.20 micron;
3. having a G.E. Bulk Brightness of about 99.4; and,
4. having a scattering coefficient of from about 0.45 to 0.42 when applied to cellophane with a 2% solution of sodium carboxymethylcellulose at a coat weight of from about 3.5 to 11.7 pounds per ream.

* * * * *